Oct. 21, 1958 J. L. CULBERTSON 2,857,484
AUTOMATIC DIAL-SPEED TESTER
Filed Jan. 25, 1954 2 Sheets-Sheet 1

Oct. 21, 1958 J. L. CULBERTSON 2,857,484

AUTOMATIC DIAL-SPEED TESTER

Filed Jan. 25, 1954 2 Sheets-Sheet 2

2,857,484
Patented Oct. 21, 1958

United States Patent Office 2,857,484

AUTOMATIC DIAL-SPEED TESTER

John L. Culbertson, Harvey, Ill., assignor to International Telephone and Telegraph Corporation, a corporation of Maryland Application January 25, 1954, Serial No. 405,739

9 Claims. (Cl. 179—175.2)

This invention relates to an automatic dial-speed tester, and its general object is to provide a new and improved dial-speed tester which tests the speed and performance of telephone dials, or impulse-sending calling devices, by testing the frequency of and the number of impulses generated thereby.

GENERAL DESCRIPTION

It has been chosen to illustrate the invention as applied to a dial-speed tester which is installed on an automatic telephone switchboard and is reached over a trunk to which access is gained from any subscriber station by the dialing of a predetermined test number, whereby a service man at a subscriber station can make connection with the dial-speed tester and use it to test the performance of the dial calling device of the station under test. For test purposes, the digit "0" is usually dialed to send a series of ten impulses into the tester. The dial-speed tester then indicates, by sending back the appropriate one of three tone signals, whether the dial speed is too slow, is normal, or is too fast.

A specific object is to provide a dial-speed tester of the foregoing character which will send back the appropriate one of two other tone signals, in lieu of a speed-indicating signal, in response to receiving a test series containing any number of impulses other than ten, one such signal for less than ten, and the other for more than ten. This feature is particularly useful for testing that type of dial sender which is arranged to give additional inter-digit time by effectively generating and cancelling an additional impulse on each operation, for such a sender may sometimes be so out of order or maladjusted that it tends to cancel an extra impulse, or to cancel none at all, whereby the dialing of the digit "0" may result in nine or eleven impulses instead of the intended ten.

According to one feature of the invention, while a dial-pulse counter is counting a series of dial impulses; local impulses are generated at a rate which is faster than the standard rate for the dial under test and are counted by a group of timing counters. A sequence counter is used to connect the local-impulse lead to the timing counters in sequence.

According to another feature, after completion of a series of impulses, the sequence counter is stepped through its remaining steps; controlling delivery of dial tone in splashes; there being one, two, or three splashes, depending upon whether the timing counters have stopped on a step indicating, respectively, a slow, normal, or fast dial.

According to another feature, when the sequence counter reaches its last step, after the tone signal has been produced; all the counters, including the sequence counter, restore in readiness for another test digit to be dialed.

Other objects and features will appear as the description progresses.

THE DRAWINGS

The drawings, comprising Figs. 1 and 2, show the preferred circuit arrangement of the chosen embodiment of the invention.

The devices shown at DPC, SEQ, TC–1, TC–2, and TC–3 (Fig. 2) are magnetic impulse counters, and may be of the type disclosed in the United States Patent No. 2,538,818 of J. I. Bellamy and R. P. Arthur, granted January 23, 1951, or in the improvement application of R. P. Arthur, Serial No. 256,888, filed November 17, 1951.

Pulse-1 relays 105 and 106 and dial-pulse counter DPC are for counting the test series of impulses from the dial; timing counters TC–1, TC–2, and TC–3 are for counting up to thirty standard local impulses received from 114 at the rate of twenty per second during receipt of the test series of impulses; whereby the operated position of the timing counters is a measure of the speed of the dial under test. Sequence counter SEQ is used to connect the operating windings of the timing counters to the source of standard impulses in sequence; and is also used to control the tone signals for dial-speed indication, and to then control restoring the counters and pulse-1 relays for another test digit.

Line relay 101, release relay 102, release auxiliary relay 103, series relay 104, knockdown relay 107 and step relays 108 and 109 are used to control the operation of the tester.

DETAILED DESCRIPTION

*Seizure*

Figure 1:
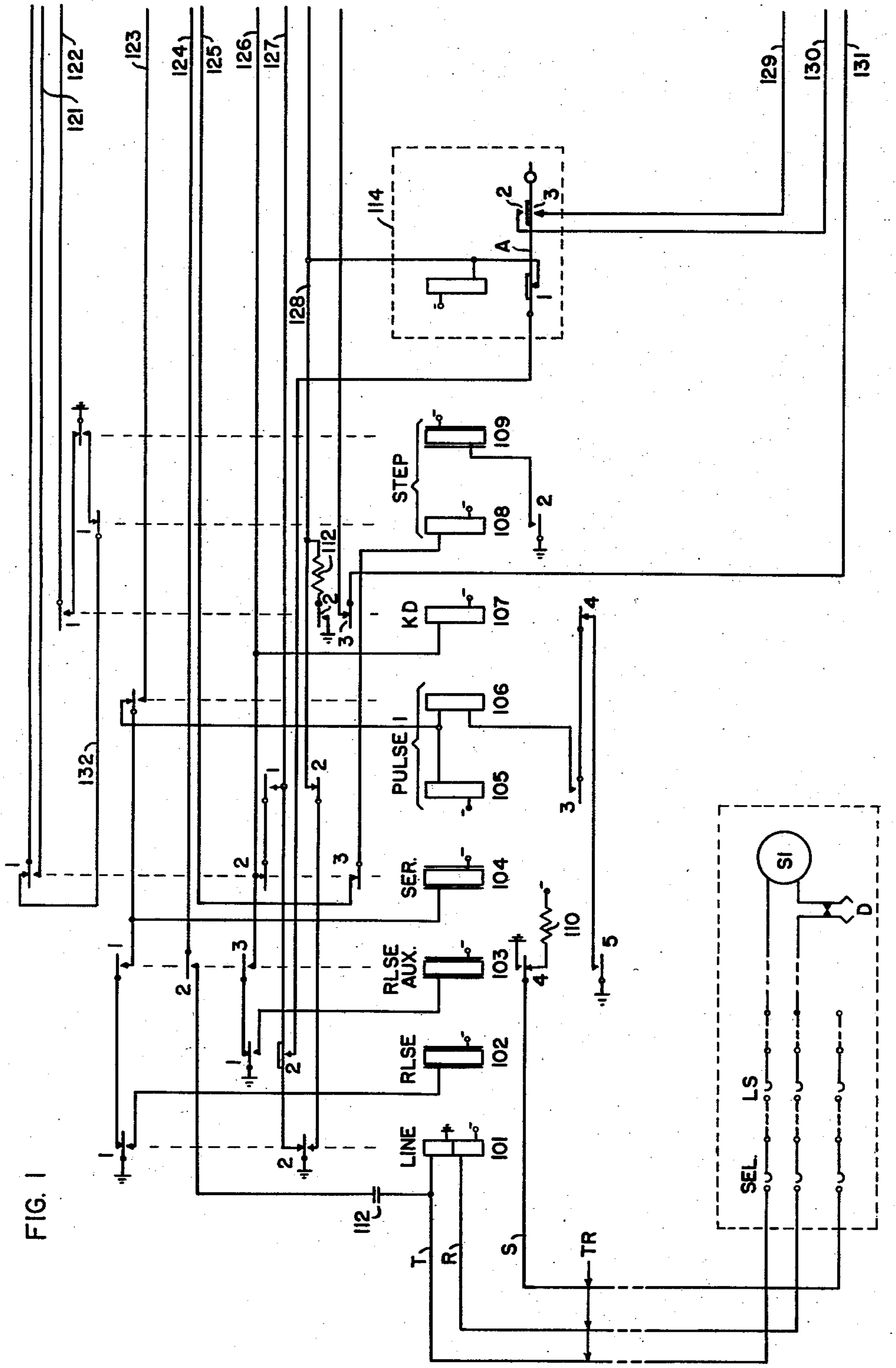
Figure 2:
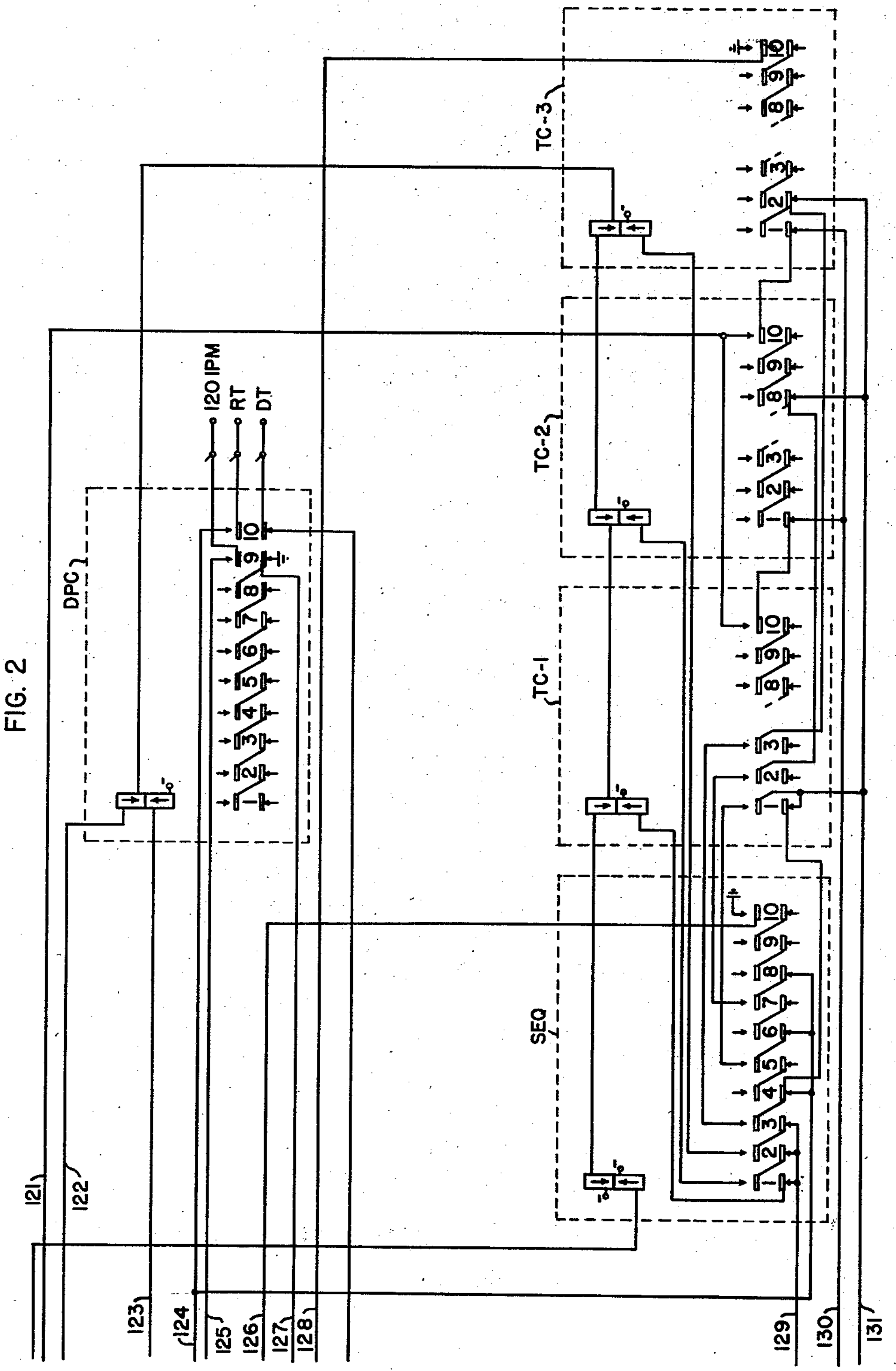

A serviceman desiring to test dial D at subscriber station S1, may lift the handset, not shown, wait for dial tone, and dial the special test number, say 9. He may then dial the test digit "0," after which he will hear a tone signal indicating the performance of the dial, followed by a steady dial tone, indicating that the test digit may be dialed again. After repeating the dialing of the test digit in this manner as many times as he wishes, he may replace the handset.

When the handset is removed from its cradle at station S1, line switch LS operates to select a trunk to an idle selector SEL and dial tone is returned to the calling line. When the test number 9 is dialed, selector SEL operates to extend the connection to trunk TR. There may be more than one tester at the central office in which case the selector SEL would select a trunk TR to an idle tester. The dial-speed tester is seized by the closure of the calling line loop through line switch LS, selector SEL, and tip and ring conductors of trunk TR, to the battery and ground connected windings of the line relay 101.

Line relay 101 operates, at its contacts 1 closes the operate circuit for release relay 102, and at its contacts 2 closes a locking circuit for standard impulse sender 114.

Release relay 102 operates, at its contacts 1 closes the operate circut for release auxiliary relay 103, and at its contacts 2 closes the operate circuit for the local impulse sender 114.

Release auxiliary relay 103 operates and at its contacts 4 removes the idle indicating battery potential from the sleeve conductor and places ground potential thereon; at its contacts 1 prepares an impulsing path; and at its contacts 5 prepares a holding path for pulse-1 relays 105 and 106. Dial tone is extended through make contacts 10 of counter DPC, through contacts 3 of relay 107, through break contacts 1 of counter TC–1, break contacts 4 of counter SEQ, to conductor 124; and is further extended by the closure of contacts 2 of release auxiliary relay 103, through tone coupling condenser 112, to the tip of the calling line.

Locking ground for local impulse sender 114 is extended through the make contacts 2 of line relay 101, through break contacts 2 of relay 105, over conductor 128, through the winding of sender 114, to battery. Armature A is thus held fully attracted to insure that when released it shall start with a full swing at its correct speed. An operate path is prepared from armature A through make contacts 2 of release relay 102 to conductor 127 which is further extended to ground at break contacts 9 of counter DPC, with an additional ground at break contacts 2 of line relay 101 when relay 101 is released.

Local impulse sender 114 may be a vibrator of the pendulum type used to generate ringing current from a direct current source, commonly known as a "pole changer," adjusted to produce impulses with the proper percent make and break. This type is chosen for its insensitiveness to voltage variations and accurately constant speed and for the facility with which it may be started operating in synchronism with the device under test. The weight on its armature A is adjusted to give exactly twenty impulses per second at each of its contacts 2 and 3 alternately.

*Test digit dialed*

Each time dial D is operated to transmit a series of circuit interruption impulses constituting a test digit, line relay 101 is restored momentarily for each such interruption impulse in a series.

Release relay 102 and release auxiliary relay 103 remain operated throughout any series of impulse-induced restorations of line relay 101.

Series relay 104 and pulse-1 relay 105 operate promptly upon the first restoration of line relay 101, the operate circuit being from the break contacts 1 of relay 101, through make contacts 1 of release auxiliary relay 103. Series relay 104 remains operated until the end of the series of impulses. Series relay 104, at its contacts 1, connects the operate circuit for counter SEQ to the sequence path from the timing counters; and at its contacts 3 opens the operate circuit of relay 108.

When pulse-1 relay 105 operates, its contacts 2 open to release the locking circuit of local-impulse sender 114, and at its contacts 3 it closes a circuit from battery through its winding and the winding of relay 106 in series to ground. Relay 106 does not operate immediately because its winding is short-circuited by ground extending through contacts 1 of relay 101, contacts 1 of relay 103, and its own contacts. When line relay 101 re-operates at the end of the first dial impulse, the ground which operated relay 105 and short-circuited relay 106 is removed, and pulse-1 relays 105 and 106 operate in series. The contacts of relay 106 connect the pulsing circuit to conductor 123.

At the second restoration of line relay 101, and at each successive restoration of the series, a ground impulse is delivered at its break contacts 1, through contacts 1 of relay 103, and the contacts of relay 106, over conductor 123, to the operate winding of dial-pulse counter DPC. The contact sets 1 to 10 of counter DPC are actuated successively, responsive respectively to the impulses 2 to 11 of the test digit. Usually the test digit consists of a series of 10 impulses and therefore operates the pulse-1 relays 105 and 106, and nine contact sets on counter DPC.

When the locking circuit of local-impulse sender 114 is opened at the beginning of the first dial impulse, at contacts 2 of relay 101 and contacts 2 of relay 105; armature A is released with a full swing, and continues to vibrate from the ground on armature A interrupted at contacts 1. Ground impulses are delivered from armature A at contacts 3 to conductor 129 at the rate of twenty per second.

The local impulses are further extended from conductor 129, through break contacts 1 of counter SEQ, to the operating coil of counter TC–1. Contact sets 1 to 10 of timing counter TC–1 are actuated successively, responsive respectively to standard impulses 1 to 10.

Upon the first standard impulse, dial tone is removed from the calling line at break contacts 1 of counter TC–1.

When the 10th standard impulse actuates contact set 10 of counter TC–1, a connection is closed from contact 2 of impulse sender 114, over conductor 130, through break contacts 1 of counter TC–2, through make contacts 10 of counter TC–1, to conductor 121, and further through make contacts 1 of series relay 104, to the operate coil of sequence counter SEQ. A ground impulse at contacts 2 of impulse sender 114, between the 10th and 11th impulses at contacts 3, is delivered over this circuit to operate counter SEQ one step, and actuate its contact set 1. Conductor 129 is disconnected at break contacts 1 of counter SEQ from the operate winding of counter TC–1, and is transferred through break contacts 2 and make contacts 1 of counter SEQ to the operate winding of counter TC–2.

Contact sets 1 to 10 of timing counter TC–2 are actuated successively, responsive respectively to standard impulses 11 to 20. When contact set 1 of counter TC–2 is actuated by the 11th standard impulse, the break contacts open the operate circuit for counter SEQ. This circuit is again closed when contact set 10 of counter TC–2 is actuated by the 20th standard impulse, the connection from conductor 130 to conductor 121 being through break contacts 1 of counter TC–3 and make contacts 10 of counter TC–2. The ground impulse delivered at contacts 2 of impulse sender 114, between the 20th and 21st impulses at contacts 3, operates counter SEQ one more step, actuating contact set 2. Standard impulse conductor 129 is disconnected from counter TC–2 at break contacts 2 of counter SEQ, and is transferred through the break contacts 3 and the make contacts 2 of counter SEQ to the operate winding of counter TC–3. Contact sets 1 to 10 of timing counter TC–3 are actuated successively, responsive respectively to the standard impulses 21 to 30. When contact set 1 of counter TC–3 is actuated by the 21st standard impulse, the break contacts open the operate circuit for counter SEQ.

If thirty standard impulses are transmitted, contacts 10 of counter TC–3 are actuated, and ground is extended through the make contact, over conductor 128, to the winding of standard-impulse sender 114, locking it from further operation by holding armature A fully attracted.

*Speed indication*

When contact set 9 of counter DPC is actuated on the 10th dial impulse, ground is removed at its break contact from conductor 127. If the test series from the dial contains ten impulses, 9 contact sets on counter DPC will be operated; contact set 10 will not be operated. When line relay 101 comes to rest, operated, at the end of the test series, series relay 104 restores after a slight delay. Ground is not extended to conductor 127 from contacts 2 of relay 101. When the ground on conductor 127, extending through contacts 2 of relay 102 to armature A of impulse sender 114, is removed; the local impulses cease, and armature A stops vibrating.

The number of contact sets operated on the timing counters TC–1, TC–2, and TC–3, is a measure of the speed of the dial under test. This embodiment of the invention is designed for a dial speed of ten impulses per second. If it requires one second to transmit the ten dial impulses, the dial is exactly correct, twenty standard impulses will have been generated by impulse sender 114, and the contacts on the timing counters will be actuated to and including set 10 of counter TC–2. The timing counters are wired to give a normal indication if they are actuated to and including contact sets 8, 9, or 10, of counter TC–2, or contact set 1 of counter TC–3. If the counters are actuated to and including contact set 2 of counter TC–3, or farther, the dial is slow. If contact set 8 of counter TC–2 is not actuated, the counters stopping before this point, the dial is fast. Therefore, up to 17 standard impulses indicate a fast dial; 18 to 21, a normal dial; and 22 or more, a slow dial.

When series relay 104 restores at the end of the series of test impulses, 120 impulse-per-minute ground pulses from the exchange interrupter are extended through make contact set 9 of counter DPC, over conductor 125, through contacts 3 of relay 104, through the winding of step relay 108 to battery. On each pulse, step relay 108 operates, and at its contacts 2 closes the operate circuit for step relay 109. Step relay 109 operates. At the end of each pulse, relay 108 releases, followed shortly by the release of slow-release relay 109. A ground pulse to wire 132, through contacts 1 of relay 108 and the contacts of relay 109, is started each time relay 108 releases and is terminated by the release of relay 109. Thus step 1 relay 108 and step 2 relay 109 generate corrected impulses at the rate of 120 per minute. These pulses are extended from wire 132, through the break contacts of series relay 104, to the battery connected operate winding of sequence counter SEQ. The unoperated contact sets of counter SEQ are actuated successively, responsive respectively to these pulses.

Dial tone, pulsed by sequence counter SEQ, is used to indicate dial speed. The source of dial tone extends through break contact 10 of counter DPC, through contact 3 of relay 107, to conductor 131. There are three possible paths for this dial tone to be extended to make contacts on counter SEQ, (1) through make contact 1 of counter TC–1 to make contacts 5 of counter SEQ, (2) through break contacts 8 of counter TC–2 and make contacts 2 of counter TC–1, to make contact 7 of counter SEQ, (3) through break contact 2 of counter TC–3 and make contact 3 of counter TC–1, to make contact 3 of counter SEQ. If the dial is fast, all three possible paths of extending dial tone from conductor 131 to the make contacts of counter SEQ remain closed at the timing counter contacts; if the dial speed is normal, two possible paths remain connected; and if the dial is slow, only one possible path remains connected at the timing counter contacts. If the dial is slow, the path is to contact set 5 of counter SEQ; if the dial is normal, to contacts 5 and 7; and if the dial is fast, to contacts 3, 5, and 7. As counter SEQ steps, these possible paths are alternately extended to conductor 124. One path closes on the operation of contact set 3 at the make contacts and opens on the operation of contact set 4 at the break contacts, another path closes on the operation of contact set 5 at the make contacts and opens on the operation of contact set 6 at the break contacts, and the last path is closed on the operation of contact set 7 at the make contacts and is opened on the operation of contact set 8 at the break contacts. Thus 1 to 3 splashes of dial tone are extended to conductor 124, which are further extended through contacts 2 of relay 103 and tone coupling condenser 112 to the tip of the calling line.

When counter SEQ has stepped to its tenth position, contact set 10 extends ground at the make contacts over conductor 126 to knockdown relay 107. Operation of relay 107 restores the counters, as explained below; and a steady dial tone signal is connected to the calling line by the closing of break contacts 1 of counter TC–1.

*Incorrect number of dial pulses*

If the number of dial pulses received is nine or less, not more than eight contact sets will be operated on counter DPC. Ground remains connected at contact set 9 of counter DPC to wire 127, and is extended through contacts 1 of operated pulse-1 relay 105. When series relay 104 restores at the end of the test series, this ground is further extended through contacts 2 of relay 104 to the winding of knockdown relay 107. Relay 107 operates and restores the counters, closing the dial tone connection at the break contacts 1 of counter TC–1, immediately returning steady dial tone signal to the calling line, without any other indication.

If the test series contains eleven or more dial impulses, all ten contact sets are operated on counter DPC. The dial tone connection is open at break contacts 10 of counter DPC, and a ring tone signal is extended through make contacts 10 to conductor 124, and is further extended through contacts 2 of relay 103, and coupling condenser 112 to the tip of the calling line. Sequence counter SEQ is stepped by impulses from stepping relays 108 and 109 as for a speed indication as explained above, operating knockdown relay 107 when contact set 10 is actuated, and restoring the counters. The path for ring tone signal is opened at make contacts 10 of counter DPC, and the path for dial tone signal is closed at break contacts 10 of counter DPC and break contacts 1 of counter TC–1. Thus the ring tone signal is transmitted to the calling line for a few seconds followed by a steady dial tone signal.

*Summary of test indications*

If ten dial impulses are received by the tester; one, two, or three splashes of dial tone are transmitted to the calling line, to indicate that the dial is slow, normal, or fast, respectively, followed by steady dial tone. If a test series of fewer than ten impulses is received, steady dial tone is transmitted to the calling line immediately. If more than ten impulses are received, ring tone is transmitted to the calling line for a short period, followed by a steady dial tone. Steady dial tone indicates that the tester is ready for another test digit to be dialed.

*Knockdown*

The counters DPC, SEQ, TC–1, TC–2, and TC–3, are held operated by residual magnetism after receiving operating pulses. Pulse-1 relays 105 and 106 are held through contacts 3 of relay 105, contacts 4 of relay 107, and contacts 5 of relay 103, to ground.

Knockdown relay 107 operates when ground appears on conductor 126. There are three possible paths for extending ground to this conductor for a short period.

(1) When sequence counter SEQ steps to position 10; ground is extended through its make contacts 10 to conductor 126, and this ground is removed when the counters restore.

(2) If a test series of less than 10 dial impulses is received, ground is extended through break contacts 9 of counter DPC, to conductor 127, through contacts 1 of relay 105, and through contacts 2 of relay 104 to conductor 126. This ground is removed when pulse-1 relay 105 restores and opens its contacts 1.

(3) The calling line may be disconnected while the counters are operated. When release relay 102 restores, ground is extended through contacts 1 of relay 102 and contacts 3 of relay 103, to conductor 126. This ground is terminated when release auxiliary relay 103, which is slow releasing, restores and opens its contacts 3.

When knockdown relay 107 is operated, ground is extended through the contacts of relay 109 and contacts 1 of relay 107 to conductor 122, and is further extended through the restoring windings of all the counters in series to battery. The magnetic flux generated by the current flow through the restoring windings is in opposition to the residual magnetism, thereby each counter restores.

Relay 107 at its contacts 4 also opens the holding circuit for relays 105 and 106. The dial tone connection is opened at contacts 3 of relay 107.

Ground is extended from contacts 2 of relay 107, through resistor 111, to the winding of local impulse sender 114. This resistance ground damps any vibrations of armature A, to prevent any spurious transmission of standard impulses to the timing counters after knockdown.

When knockdown relay 107 releases, the tester is ready for another test digit to be dialed, and dial tone signal is transmitted to the calling line.

*Disconnect*

When the serviceman at station S1 returns the handset to its cradle, the calling line loop is opened and line relay 101 restores. Release relay 102 restores shortly following the opening of its operate circuit at contacts 1 of relay 101. Release relay 102 at its contacts 1 opens the operate circuit for release auxiliary relay 103, which restores shortly.

Knockdown relay 107 operates from the ground pulse through contacts 1 of relay 102 and contacts 3 of relay 103. Any operated counters are thereby restored.

All relays are released, and all ground connections to standard impulse sender 114 are opened. At contacts 4 of relay 103, ground is removed from the sleeve of trunk TR, an idle indicating battery connected thereto. The tester is ready to be seized for further use.

I claim:

1. In combination, an impulse sender, a tester, means for operatively associating the sender with the tester, means responsive thereto for initiating the transmission of a start signal to the sender from the tester, a counter in the tester for counting the impulses in a series transmitted by the sender, means in the tester for terminating the start-signal transmission during the transmission of a series of impulses and for resuming the start-signal transmission responsive to the end of the series of impulses as marked by a timed non-impulse interval longer than any inter-impulse interval during the series, first-condition signal means and means rendering it controlled by the counter dependent upon the counted series having contained a predetermined standard number of impulses for preceding the resumption of the start-signal transmission by the temporary transmission of a first-condition signal during the latter part of the said time interval, and second-condition signal means and means rendering it controlled by the counter dependent upon the counted series having contained a number of impulses differing from said standard number by at least one impulse in a given direction of difference for preceding the resumption of the start-signal transmission by the temporary transmission of a second-condition signal during the latter part of said timed interval.

2. In a combination according to claim 1, timing means in the tester and means for operating it according to whether the time elapsing during the receipt of a said standard number of impulses is less than, is substantially equal to, or is more than, a predetermined standard time interval, and means controlled by the timing means for modifying the said first-condition signal into any one of three first-condition signals indicative respectively of the said timing comparisons.

3. In combination, an impulse sender, a tester, means for operatively associating the sender with the tester, a counter in the tester for counting the impulses in a series transmitted by the sender, timing means for timing the interval elapsing during the receipt of a series of impulses, first-condition signal means controlled jointly by said counter and said timing means dependent upon the counted series having contained a predetermined number of impulses for transmitting a first-condition signal of an identity indicative of the length of said interval, and second-condition signal means controlled by said counter dependent upon the counted series having contained a number of impulses differing from said predetermined number for transmitting a second-condition signal indicative of whether the number of impulses in the series was more than or less than the predetermined number.

4. In a combination according to claim 3, means for starting said timing means responsive to the beginning of the receipt of a series of impulses, and means for stopping it responsive either to the receipt of the said standard number of impulses or to the receipt of the last impulse of a series containing less than said standard number.

5. In combination, an impulse sender for sending a series of impulses normally not exceeding a standard maximum number and at a rate which preferably is standard, a tester, means for operatively associating the sender with the tester, a first impulse counter in the tester for counting the impulses in a series transmitted by the sender, a local generator of impulses having a rate higher than said standard rate, local counting means comprising a series of local impulse counters each capable of counting said standard number of impulses and means for operating them in sequence to count a series of impulses from the local generator greater than said standard number, means for starting the local counting means responsive to the beginning of a series of impulses from the sender and for stopping it at the end thereof, sequence stepping means external to said local impulse counters for substituting the next counter in the series when the sequence means is stepped and means controlled by any said local counter preceding the last for operating the sequence means, and means selectively controlled according to the number of local impulses counted by the local counting means for producing an indication of the rate of impulsing of said sender as compared to the preferred standard rate.

6. In a combination according to claim 5, said means for stopping the local counting means including means for stopping it responsive to the receipt of the final impulse of a series containing a standard number of impulses irrespective of whether such series is part of a larger series which contains a further impulse.

7. In a combination according to claim 5, said means for producing an indication of the rate of impulsing includes means for stepping said sequence means through further successive steps, and includes means responsive to such stepping of the sequence means for producing a number of signals which depends on the rate of impulsing of said sender.

8. In a combination according to claim 7, means responsive to the sequence means being stepped through a further step after the said number of signals is produced for restoring the counters and sequence means of the tester in readiness for a further series of impulses from the sender.

9. In combination, counting means comprising a series of counters each capable of counting a group of successive impulses, a source of an indefinite series of spaced impulses and means for connecting it to the first of said counters, means responsive to the counting of the last impulse of a group by any counter preceding the last for transferring the source of impulses into connection with the next succeeding counter during the interval between the last impulse of such group and the next succeeding impulse of the said series.

References Cited in the file of this patent

UNITED STATES PATENTS 1,784,612 Priest ---------------- Dec. 9, 1930